United States Patent
Arai

(10) Patent No.: US 10,659,673 B2
(45) Date of Patent: May 19, 2020

(54) CONTROL APPARATUS, CONTROL METHOD, AND NON-TRANSITORY COMPUTER-READABLE STORAGE MEDIUM

(71) Applicant: CANON KABUSHIKI KAISHA, Tokyo (JP)

(72) Inventor: Tomoaki Arai, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/507,178

(22) Filed: Jul. 10, 2019

(65) Prior Publication Data
US 2019/0335085 A1    Oct. 31, 2019

Related U.S. Application Data

(63) Continuation of application No. 15/856,327, filed on Dec. 28, 2017, now Pat. No. 10,397,461.

(30) Foreign Application Priority Data

Jan. 5, 2017  (JP) ................ 2017-000709

(51) Int. Cl.
| | |
|---|---|
| *H04N 5/232* | (2006.01) |
| *H04N 5/38* | (2006.01) |
| *H04N 5/247* | (2006.01) |
| *H04N 5/272* | (2006.01) |
| *G06T 7/194* | (2017.01) |
| *G06T 7/60* | (2017.01) |
| *G06T 7/70* | (2017.01) |

(52) U.S. Cl.
CPC ......... *H04N 5/23203* (2013.01); *G06T 7/194* (2017.01); *H04N 5/23206* (2013.01); *H04N 5/247* (2013.01); *H04N 5/272* (2013.01); *H04N 5/38* (2013.01); *G06T 7/60* (2013.01); *G06T 7/70* (2017.01)

(58) Field of Classification Search
CPC .................................................. H04N 5/23203
USPC ........................................................ 348/211.4
See application file for complete search history.

(56) References Cited

U.S. PATENT DOCUMENTS

| | | | |
|---|---|---|---|
| 10,051,180 B1 * | 8/2018 | Chen .................... | G06T 3/4038 |
| 2013/0170557 A1 | 7/2013 | Wang et al. | |

FOREIGN PATENT DOCUMENTS

| | | |
|---|---|---|
| JP | 2012-015669 A | 1/2012 |
| JP | 2014-191475 A | 10/2014 |

* cited by examiner

*Primary Examiner* — Joel W Fosselman

(74) *Attorney, Agent, or Firm* — Venable LLP

(57) ABSTRACT

First information is obtained from a first control apparatus for controlling a first image capturing device on an upstream side of an image capturing device. Based on a captured image obtained by the image capturing device and the first information, second information used to generate a 3D model of an object in the captured image is generated. Transmission information is transmitted to a second control apparatus for controlling a second image capturing device on a downstream side. Generation of the transmission information is controlled in accordance with a size of the object in the captured image or the size and a position of the object in the captured image in a case in which the captured image obtained by the image capturing device includes an invalid object that is not an object corresponding to information registered in advance.

10 Claims, 7 Drawing Sheets

CONTROL APPARATUS, CONTROL METHOD, AND NON-TRANSITORY COMPUTER-READABLE STORAGE MEDIUM

This application is a continuation of application Ser. No. 15/856,327 filed Dec. 28, 2017.

BACKGROUND OF THE INVENTION

Field of the Invention

The present invention relates to a control technique of an image capturing device that captures an image of an object from a plurality of directions.

Description of the Related Art

In these days, a technique of performing synchronous shooting at multi-viewpoints using a plurality of cameras placed at different positions and generating a virtual viewpoint content using multi-viewpoint images obtained by the shooting has received attention. According to the technique of generating the virtual viewpoint content from the multi-viewpoint images in the above-described way, for example, highlight scenes of a soccer or basketball game can be viewed from various angles. This can give a user a realistic feeling as compared to normal images.

On the other hand, generation and viewing of the virtual viewpoint content based on the multi-viewpoint images can be implemented by collecting images shot by the plurality of cameras to an image processing unit such as a server and causing the image processing unit to execute processing such as 3D (three-dimensional) model generation and rendering and transmit the images to a user terminal.

If the image of one of the plurality of cameras is an image (to be referred to as a fault image hereinafter) inappropriate for generation of a virtual viewpoint content, the image affects the generation of the virtual viewpoint content as well. Note that the fault image to be described here includes an image with a foreign object sticking to a camera lens, an image including a spectator who stands up in front of the camera, and an image including a flag that supporters in front of the camera are waving.

As a conventional technique, there has been proposed a technique in which the average value of luminance statistics is calculated for each of images shot by a plurality of cameras, and if a statistic calculated for an image is a predetermined value or more, or the difference from the statistic of another image is a predetermined value or more, the target image is determined as a fault image and excluded (Japanese Patent Laid-Open No. 2014-191475).

As another conventional technique, there has been proposed a technique in which if the discontinuity of edges included in an input image is detected, the input image is determined to have a fault, and high image quality processing is set to OFF, or interpolation frame generation processing of high frame rate processing is changed (Japanese Patent Laid-Open No. 2012-015669).

For example, when shooting a player playing under circumstances where the stadium casts a shadow on a part of the ground, the range including the shadow changes depending on the camera. For this reason, the luminance statistics of images shot by the cameras readily have divergences. In this case, the technique described in Japanese Patent Laid-Open No. 2014-191475 may make an error in determining whether an image is a fault image or not. Additionally, if an image is determined as a fault image, it affects generation of a virtual viewpoint content because there is no function of controlling a reference camera or notifying an adjacent camera.

In the technique described in Japanese Patent Laid-Open No. 2012-015669, for example, if shooting is done under circumstances where a small foreign object sticks to a camera lens, the discontinuity of the edges of the foreign object is detected. Hence, an error may be made in determining whether an image is a fault image or not. Additionally, if an image is determined as a fault image, it affects generation of a virtual viewpoint content because there is no function of notifying an adjacent camera, although there is an explicit description about control of a reference camera.

SUMMARY OF THE INVENTION

The present invention has been made in consideration of the problems, and provides a technique of suppressing or eliminating a cause of an adverse effect on generation of a virtual viewpoint content.

According to one aspect of the present invention, there is provided a control apparatus of an image capturing device, comprising: an obtain unit configured to obtain first information from a first control apparatus for controlling a first image capturing device on an upstream side of the image capturing device; a generation unit configured to generate, based on a captured image obtained by the image capturing device and the first information, second information used to generate a 3D model of an object in the captured image; a transmit unit configured to transmit transmission information being based on the first information and the second information to a second control apparatus for controlling a second image capturing device on a downstream side, and a control unit configured to control generation of the transmission information in accordance with a size of the object in the captured image or the size and a position of the object in the captured image in a case in which the captured image obtained by the image capturing device includes an invalid object that is not an object corresponding to information registered in advance.

According to another aspect of the present invention, there is provided a control method of an image capturing device, comprising: obtaining first information from a first control apparatus for controlling a first image capturing device on an upstream side of the image capturing device; generating, based on a captured image obtained by the image capturing device and the first information, second information used to generate a 3D model of an object in the captured image; transmitting transmission information being based on the first information and the second information to a second control apparatus for controlling a second image capturing device on a downstream side, and controlling generation of the transmission information in accordance with a size of the object in the captured image or the size and a position of the object in the captured image in a case in which the captured image obtained by the image capturing device includes an invalid object that is not an object corresponding to information registered in advance.

According to still another aspect of the present invention, there is provided a non-transitory computer-readable storage medium storing a computer program configured to cause a computer of a control apparatus of an image capturing device to function as an obtain unit configured to obtain first information from a first control apparatus for controlling a first image capturing device on an upstream side of the image capturing device; a generation unit configured to generate, based on a captured image obtained by the image capturing device and the first information, second information used to generate a 3D model of an object in the captured image; a transmit unit configured to transmit transmission information being based on the first information and the second information to a second control apparatus for controlling a second image capturing device on a downstream side, and a control unit configured to control generation of the transmission information in accordance with a size of the object in the captured image or the size and a position of the object in the captured image in a case in which the captured image obtained by the image capturing device includes an invalid object that is not an object corresponding to information registered in advance.

Further features of the present invention will become apparent from the following description of exemplary embodiments (with reference to the attached drawings).

DESCRIPTION OF THE EMBODIMENTS

The embodiments of the present invention will now be described with reference to the accompanying drawings. Note that each embodiment to be described below is an example of detailed practice of the present invention, and one of detailed examples of arrangements defined in the scope of claims.

First Embodiment

Figure 1:
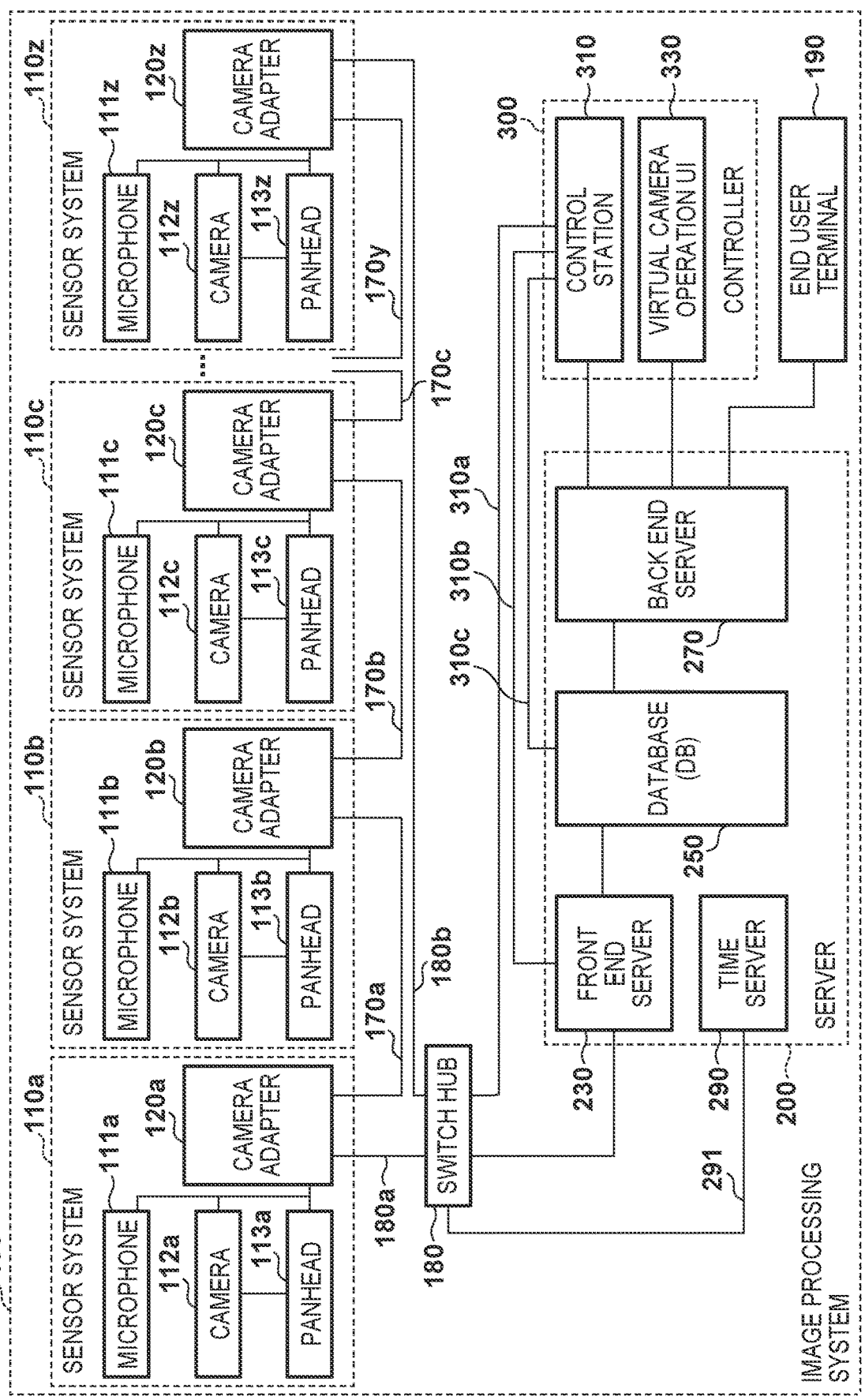
FIG. 1 is a block diagram showing an example of the functional arrangement of an image processing system.

An image processing system that performs shooting and sound collection by placing a plurality of cameras and microphones in a facility such as an arena (stadium) or a concert hall will be described with reference to the block diagram of FIG. 1 showing an example of the functional arrangement of the image processing system. The image processing system 100 shown in FIG. 1 includes a sensor system 110a (one end: most upstream) to a sensor system 110z (the other end: most downstream), a server 200, a controller 300, a switch hub 180, and an end user terminal 190.

The controller 300 will be described first. The controller 300 includes a control station 310 and a virtual camera operation UI (User Interface) 330. The control station 310 performs management of operation states and parameter setting control for various functional units included in the image processing system 100 via networks 310a to 310c, 180a, 180b, and 170a to 170y. Each network may be GbE (Gigabit Ethernet) or 10 GbE, which is Ethernet® complying with the IEEE standard, or may be formed by combining interconnect Infiniband, industrial Ethernet, and the like. The network is not limited to these, and may be a network of another type.

An operation of transmitting 26 sets of images and sounds obtained by the sensor systems 110a to 110z from the sensor system 110z to the server 200 will be explained first. In the image processing system 100 according to this embodiment, the sensor systems 110a to 110z are connected by a daisy chain.

In this embodiment, the 26 sensor systems 110a to 110z will be expressed as sensor systems 110 without distinction unless specifically stated otherwise. Similarly, functional units in each sensor system 110 will be expressed as a microphone 111, a camera 112, a panhead 113, and a camera adapter 120 without distinction unless specifically stated otherwise. Note that the number of sensor systems is 26. However, the number of sensor systems is merely an example and is not limited to this. Note that in this embodiment, a term "image" includes the concepts of both a moving image and a still image unless specifically stated otherwise. That is, the image processing system 100 according to this embodiment can process both a still image and a moving image. In this embodiment, an example in which a virtual viewpoint content provided by the image processing system 100 includes both a virtual viewpoint image and a virtual viewpoint sound will mainly be described. However, the present invention is not limited to this. For example, the virtual viewpoint content need not include a sound. Additionally, for example, the sound included in the virtual viewpoint content may be a sound collected by a microphone closest to the virtual viewpoint. In this embodiment, a description of a sound will partially be omitted for the sake of descriptive simplicity. Basically, an image and a sound are processed together.

The sensor systems 110a to 110z include single cameras 112a to 112z, respectively. That is, the image processing system 100 includes a plurality of cameras to shoot an object from a plurality of directions. The plurality of sensor systems 110 are connected to each other by a daisy chain. It is specified here that this connection form has the effect of decreasing the number of connection cables and saving labor in a wiring operation when increasing the image data capacity along with an increase in a shot image resolution to 4K or 8K and an increase in the frame rate.

Note that the present invention is not limited to this, and as the connection form, the sensor systems 110a to 110z may be connected to the switch hub 180 to form a star network in which data transmission/reception among the sensor systems 110 is performed via the switch hub 180.

FIG. 1 shows an arrangement in which all the sensor systems 110a to 110z are cascade-connected so as to form a daisy chain. However, the present invention is not limited to this. For example, the plurality of sensor systems 110 may be divided into some groups, and the sensor systems 110 may be connected by a daisy chain in each divided group. The camera adapter 120 of the sensor system 110 at the end of a division unit may be connected to the switch hub 180 to input an image to the server 200. This arrangement is particularly effective in a stadium. For example, a case in which a stadium includes a plurality of floors, and the sensor system 110 is disposed in each floor can be considered. In this case, input to the server 200 can be done in every floor or every half round of the stadium. Even in a place where wiring to connect all the sensor systems 110 by one daisy chain is difficult, the placement can be simplified, and the system can be made versatile.

Control of image processing in the server 200 is switched depending whether one camera adapter 120 or two or more camera adapters 120 are connected by a daisy chain to input images to the server 200. That is, control is switched depending on whether the sensor systems 110 are divided into a plurality of groups. In a case in which one camera adapter 120 inputs images to the server 200, since an all-round image of the arena is generated while transmitting images through the daisy chain connection, the timings that all-round image data are completely collected in the server 200 are synchronized. That is, the timings are synchronized unless the sensor systems 110 are divided into groups. However, in a case in which a plurality of camera adapters 120 input images to the server 200 (the sensor systems 110 are divided into groups), the delay may change between the lanes (routes) of daisy chains. It is therefore specified that image processing of a subsequent stage needs to be executed while checking collection of image data by synchronous control of establishing synchronization after the all-round image data are completely collected in the server 200.

In this embodiment, a description will be made assuming that the sensor system 110 includes the microphone 111, the camera 112, the panhead 113, and the camera adapter 120. However, the arrangement of the sensor system 110 is not limited to this arrangement. That is, the sensor system 110 need only include at least one camera adapter 120 and one camera 112. Alternatively, for example, the sensor system 110 may be formed by one camera adapter 120 and a plurality of cameras 112, or may be formed by one camera 112 and a plurality of camera adapters 120. That is, the plurality of cameras 112 and the plurality of camera adapters 120 in the image processing system 100 are in an N-to-M (N and M are integers of 1 or more) correspondence. The sensor system 110 may include devices other than the microphone 111, the camera 112, the panhead 113, and the camera adapter 120. The camera 112 and the camera adapter 120 may be integrated. At least some functions of the camera adapter 120 may be imparted to a front end server 230. Note that all the sensor systems 110a to 110z need not have the same arrangement, and the arrangement may change between the sensor systems 110.

A sound collected by a microphone 111a and an image shot by a camera 112a undergo image processing (to be described later) by a camera adapter 120a and are then transmitted to a camera adapter 120b of the sensor system 110b via the network 170a. Similarly, the sensor system 110b transmits a sound collected by a microphone 111b and an image shot by a camera 112b to the sensor system 110c together with the image and the sound acquired from the sensor system 110a. When each of the sensor systems 110a to 110z performs such an operation, the images and sounds acquired by the sensor systems 110a to 110z are transmitted from the sensor system 110z to the server 200 via the network 180b and the switch hub 180.

Note that in this embodiment, the cameras 112a to 112z are separated from the camera adapters 120a to 120z. However, the camera and the camera adapter may be integrated in a single housing. In this case, the microphone 111 may be incorporated in the integrated camera 112 or may be connected to the outside of the camera 112.

The camera 112 is placed on the panhead 113. The panhead 113 changes the posture (direction of shooting) of the mounted camera 112 in accordance with a control instruction input according to a user operation on the virtual camera operation UI 330. Note that the panhead 113 may be controlled based on not the control instruction from the virtual camera operation UI 330 but an instruction from another device.

The arrangement and operation of the server 200 will be described next. The server 200 according to this embodiment processes data acquired from the sensor system 110z. The server 200 includes the front end server 230, a database 250 (to be also referred to as a DB hereinafter), a back end server 270, and a time server 290.

The time server 290 has a function of distributing a time and synchronization signal, and distributes a time and synchronization signal to the sensor systems 110a to 110z via the switch hub 180. Upon receiving the time and synchronization signal, the camera adapters 120a to 120z perform image frame synchronization by genlocking the cameras 112a to 112z based on the time and synchronization signal. That is, the time server 290 synchronizes the shooting timings of the plurality of cameras 112. Accordingly, since the image processing system 100 can generate a virtual viewpoint image based on the plurality of images shot at the same timing, lowering of the quality of the virtual viewpoint image caused by the shift of shooting timings can be suppressed. Note that in this embodiment, the time server 290 manages the time synchronization of the plurality of cameras 112. However, the present invention is not limited to this, and the cameras 112 or camera adapters 120 may independently perform processing for the time synchronization.

The front end server 230 reconstructs a segmented transmission packet from an image and sound acquired from the sensor system 110z, converts the packet into data of a data format, and writes it in the database 250 in accordance with a camera identifier, data type, and frame number.

The back end server 270 receives a viewpoint designation from the virtual camera operation UI 330, reads out a corresponding image and sound data from the database 250 based on the received viewpoint, and performs rendering processing, thereby generating a virtual viewpoint image. The virtual camera operation UI 330 is a user interface that allows the user to do an operation of designating a viewpoint, and is formed by, for example, a keyboard, a mouse, or a touch panel screen. However, any UI can be applied to the virtual camera operation UI 330 as long as it can be operated by the user to perform the operation of designating a viewpoint.

Note that the arrangement of the server 200 is not limited to this. For example, at least two of the front end server 230, the database 250, and the back end server 270 may be integrated. In addition, at least one of the front end server 230, the database 250, and the back end server 270 may include a plurality of devices. A device other than the above-described devices may be included at an arbitrary position in the server 200. Furthermore, at least some of the functions of the server 200 may be imparted to the end user terminal 190 or the virtual camera operation UI 330.

The image rendered by the back end server 270 is transmitted to the end user terminal 190. The user who operates the end user terminal 190 can view the image and listen to the sound according to the designated viewpoint. The virtual viewpoint content according to this embodiment is a content including a virtual viewpoint image as an image obtained when an object is shot from a virtual viewpoint. In other words, the virtual viewpoint image can be said to be an image representing a sight from a designated viewpoint. The virtual viewpoint may be designated by the user or may automatically be designated based on a result of image analysis or the like. That is, the virtual viewpoint image includes an arbitrary viewpoint image (free-viewpoint image) corresponding to a viewpoint arbitrarily designated by the user. The virtual viewpoint image also includes an image corresponding to a viewpoint designated by the user from a plurality of candidates or an image corresponding to a viewpoint automatically designated by the device. Note that in this embodiment, an example in which a virtual viewpoint content includes sound data (audio data) will mainly be described. However, sound data need not always be included. The back end server 270 may compression-code the virtual viewpoint image by a standard technique represented by H.264 or HEVC and then transmit the virtual viewpoint image to the end user terminal 190 using the MPEG-DASH protocol. The virtual viewpoint image may be transmitted to the end user terminal 190 in a non-compressed state. In particular, the end user terminal 190 is assumed to be a smartphone or a tablet in the former case in which compression-coding is performed, and is assumed to be a display capable of displaying a non-compressed image in the latter case. That is, it is specified that the image format can be switched in accordance with the type of the end user terminal 190. The image transmission protocol is not limited to MPEG-DASH. For example, HLS (HTTP Live Streaming) or any other transmission method is usable.

As described above, the image processing system 100 includes three functional domains, that is, a video collection domain, a data storage domain, and a video generation domain. The video collection domain includes the sensor systems 110a to 110z, the data storage domain includes the database 250, the front end server 230, and the back end server 270, and the video generation domain includes the virtual camera operation UI 330 and the end user terminal 190. However, the arrangement is not limited to this. For example, the virtual camera operation UI 330 can also directly acquire images from the sensor systems 110a to 110z. In this embodiment, however, not the method of directly acquiring images from the sensor systems 110a to 110z but the method of arranging the data storage function midway is employed. More specifically, the front end server 230 converts image data and sound data generated by the sensor systems 110a to 110z and meta information of these data into a common schema and data type of the database 250. Accordingly, even if the cameras 112 of the sensor systems 110a to 110z change to cameras of another type, the difference caused by the change can be absorbed by the front end server 230, and the data can be registered in the database 250. This can reduce the fear that the virtual camera operation UI 330 does not appropriately operate in a case in which the cameras 112 change to cameras of another model.

In addition, the virtual camera operation UI 330 is configured to access the database 250 not directly but via the back end server 270. Common processing associated with image generation is performed by the back end server 270, and the difference portion of the application associated with the operation UI is performed by the virtual camera operation UI 330. Hence, when developing the virtual camera operation UI 330, the developer can concentrate on developing a UI operation device or functional requirements of a UI that operates a virtual viewpoint image to be generated. In addition, the back end server 270 can also add or delete common processing associated with image generation in accordance with a request of the virtual camera operation UI 330. This enables to flexibly cope with a request of the virtual camera operation UI 330.

In the image processing system 100, the back end server 270 thus generates a virtual viewpoint image based on image data based on shooting by the plurality of cameras 112 configured to shoot an object from the plurality of directions. Note that the image processing system 100 according to this embodiment is not limited to the above-described physical arrangement and may have a logical arrangement.

An example of the functional arrangement of the camera adapter 120 will be described next with reference to the block diagram of FIG. 2.

A video input unit 121 is an input interface corresponding to a standard such as SDI (Serial Digital Interface). The video input unit 121 acquires an image captured by the camera 112 (the camera 112 in the same sensor system 110 as the video input unit 121) as a local camera image (an image captured by the image capturing device of interest) and writes it in a storage unit 126. The video input unit 121 also captures ancillary data to be superimposed on the SDI. The ancillary data includes camera parameters such as the zoom ratio, exposure, and color temperature of the camera 112 and a time code. The ancillary data is used by functional units (FIG. 3) included in the camera adapter 120.

A data receiving unit 122 is connected to the camera adapter 120 on the upstream side. For example, the data receiving unit 122 in the camera adapter 120b of the sensor system 110b is connected to the camera adapter 120a of the sensor system 110a. The data receiving unit 122 receives, from the camera adapter 120 on the upstream side, a foreground image (upstream foreground image), a background image (upstream background image), 3D model information (upstream 3D model information), an object extraction image (upstream object extraction image), and the like generated by the camera adapter 120 on the upstream side. The data receiving unit 122 writes these data received from the camera adapter 120 on the upstream side in the storage unit 126.

A fault image determination unit 123 determines whether the local camera image is an image inappropriate for generation of a virtual viewpoint content. The determination result of the fault image determination unit 123 is notified to the functional units included in the camera adapter 120. The fault image determination unit 123 also has a function of generating a mask-processed image by replacing an image in a region determined to have a fault in the local camera image with an image in a corresponding region of a background image. Details of the fault image determination unit 123 will be described later.

A foreground/background separation unit 124 separates the local camera image input from the video input unit 121 or the mask-processed image generated by the fault image determination unit 123 into a foreground image and a background image. The foreground image is, for example, a foreground image obtained as a result of object detection from an image (local camera image or mask-processed image). The background image is an image obtained by excluding the foreground image from the image (local camera image or mask-processed image).

Note that the object is, for example, a person. However, the object may be a specific person (a player, a coach, and/or a referee) or an object such as a ball or goal with a predetermined image pattern. A moving body may be detected as the object. When a foreground image including an important object such as a person and a background image that does not include such an object are separated and processed, the quality of the image of a portion corresponding to the object in a virtual viewpoint image generated by the image processing system 100 can be improved. In addition, when the separation of the foreground image and the background image is performed by the camera adapter 120, the load in the image processing system 100 including the plurality of cameras 112 can be distributed.

A generation unit 125 generates image information (to be referred to as 3D model information hereinafter) concerning the 3D model of the object using the foreground image separated by the foreground/background separation unit 124 and the upstream foreground image stored in the storage unit 126 and using, for example, the principle of a stereo camera.

The storage unit 126 is a storage device, for example, a magnetic disk such as a hard disk, a non-volatile memory, or a volatile memory. The storage unit 126 functions as a memory configured to store a data group received by the data receiving unit 122 or data under or as a result of processing by the fault image determination unit 123, the foreground/background separation unit 124, or the generation unit 125. The storage unit 126 also stores known information to be described later in this embodiment.

A data transmitting unit 127 is connected to the camera adapter 120 on the downstream side. For example, the data transmitting unit 127 in the camera adapter 120b of the sensor system 110b is connected to the camera adapter 120c of the sensor system 110c. The data transmitting unit 127 transmits a foreground image, a background image, 3D model information, an object extraction image, and an image group received from the camera adapter 120 on the upstream side to the camera adapter 120 on the downstream side.

An example of the functional arrangement of the fault image determination unit 123 will be described next with reference to the block diagram of FIG. 3.

An object extraction unit 401 has a function of extracting an object from a local camera image. The object extraction unit 401 extracts, as an object region, a region including an object from the difference between a background image separated by the foreground/background separation unit 124 from an image (local camera image or mask-processed image) one or more frames back and the local camera image of the current frame. Note that the object is a person such as a player, a coach, a referee, or a spectator or an object such as a ball, a goal, or a flag. The background image is not limited to the background image generated by the foreground/background separation unit 124 and may be an image shot upon placing the camera or an image shot before a game.

Figure 4A:
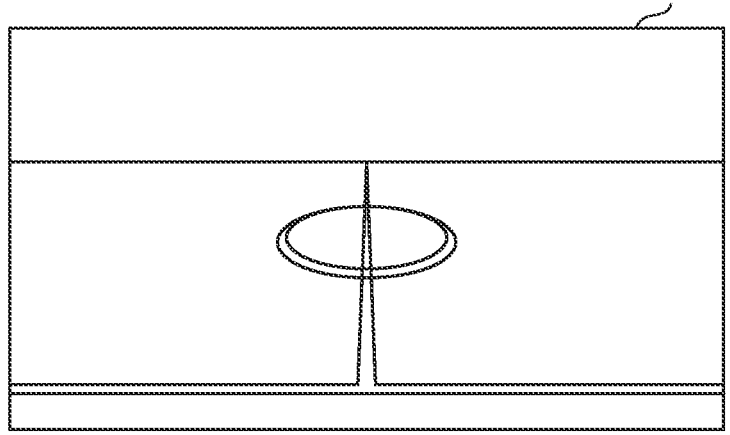
FIG. 4A is a view for explaining the operation of an object extraction unit 401.
Figure 4B:
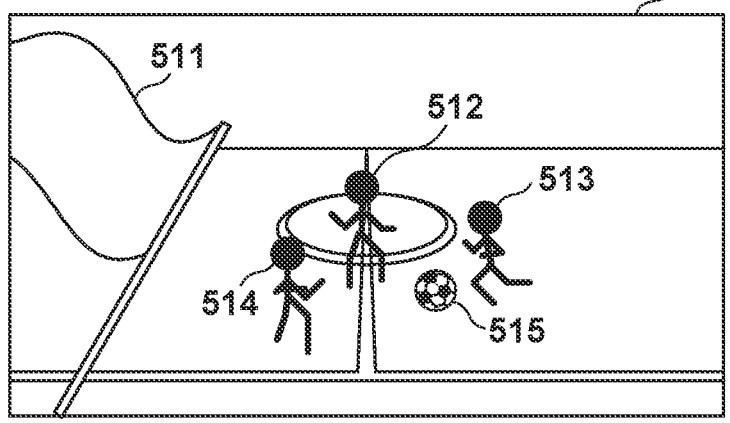
FIG. 4B is a view for explaining the operation of the object extraction unit 401.
Figure 4C:
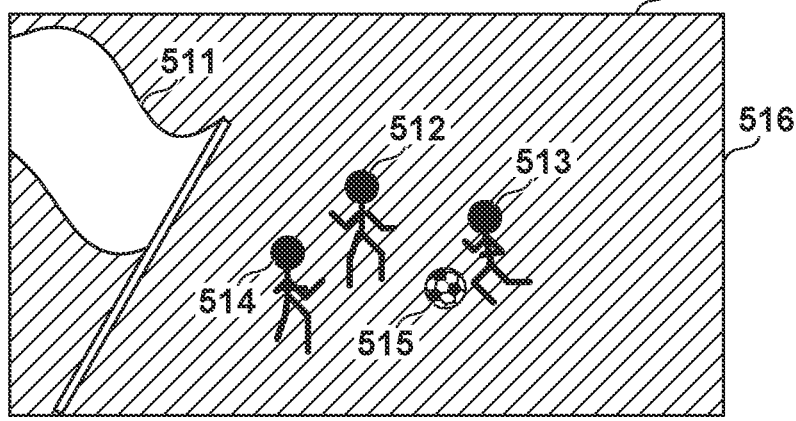
FIG. 4C is a view for explaining the operation of the object extraction unit 401.

The operation of the object extraction unit 401 will be described using examples shown in FIGS. 4A to 4C. An image 500 shown in FIG. 4A is a background image separated from an image (local camera image or mask-processed image) one or more frames back by the foreground/background separation unit 124. An image 510 shown in FIG. 4B is the local camera image of a current frame acquired by the video input unit 121. The image 510 includes a flag 511, a player 512, a player 513, a player 514, and a ball 515 as objects. The object extraction unit 401 compares pixel values at corresponding pixel positions in the images 500 and 510 and extracts a set of pixels each having a pixel value with a difference equal to or larger than a predetermined value as an object region. In the case of the images 500 and 510, the pixel values of pixels in the regions of the objects, that is, the flag 511, the players 512 to 514, and the ball 515 in the image 510 are different from the pixel values of pixels at corresponding pixel positions in the image 500. Hence, the regions of these objects are extracted. The object extraction unit 401 generates a (masked) image as an object extraction image 520 (FIG. 4C) by setting pixel values in a region 516 (FIG. 4C) other than the regions of these objects in the image 510 to a predetermined value (for example, R=G=B=0: black).

Referring back to FIG. 3, for each of the regions of the objects included in the object extraction image, a histogram extraction unit 402 generates the distribution of the pixel values (the luminance values of a red component (R), a green component (G), and a blue component (B)) of the pixels that constitute the region. The histogram extraction unit 402 then generates histogram table data that associates, for each object included in the object extraction image, identification information used to specify the object with the distribution generated for the object.

An object determination unit 403 determines, for each object included in the object extraction image, whether the object is an object (valid object) valid as a shooting target. When shooting, for example, a soccer game, the shooting target means an object such as a person (a player, a coach, or a referee), a ball, or a goal on the field.

Figure 5:
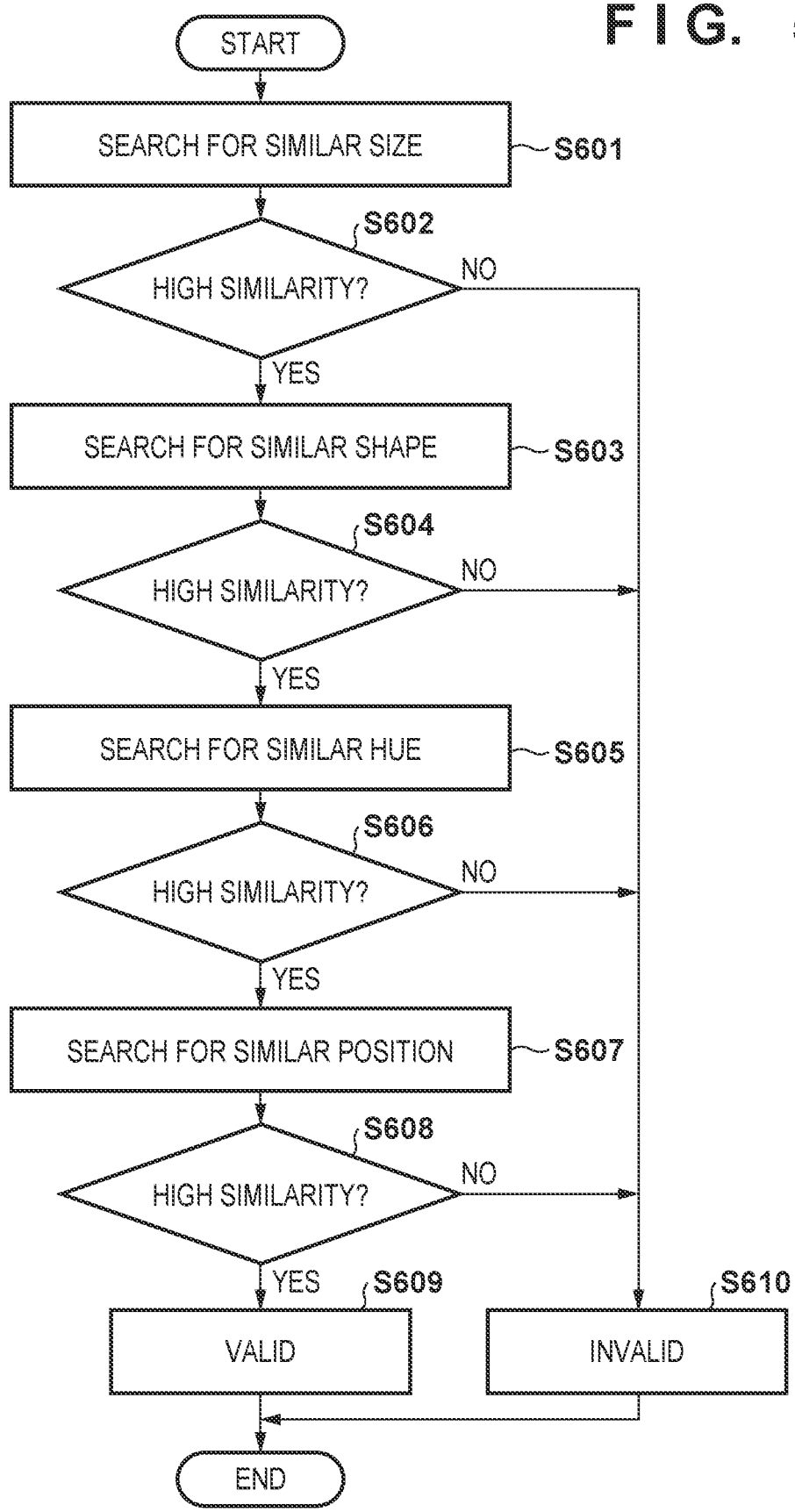
FIG. 5 is a flowchart of processing performed by an object determination unit 403.

Processing performed by the object determination unit 403 to determine, for each object included in the object extraction image, whether the object is a valid object will be described with reference to the flowchart of FIG. 5. The flowchart shown in FIG. 5 is a flowchart of determination processing for one object (object of interest). In fact, the object determination unit 403 performs the processing according to the flowchart of FIG. 5 for each object included in the object extraction image.

In step S601, the object determination unit 403 searches a size table created in advance and stored in the storage unit 126 for a size similar to the size of the object of interest in the object extraction image. The size of each object on an image is registered in the size table for each object valid as a shooting target. Here, the size of an object is defined by the numbers of vertical and horizontal pixels of a rectangle including the object.

The size table is constituted by at least one size parameter. For example, when shooting a soccer game, the size of an object such as a person (a player, a coach, or a referee), a ball, or a goal on the field is registered. Note that the sizes registered in the size table may be changed dynamically based on a zoom ratio included in SDI ancillary data captured by the video input unit 121. In this case, the sizes after the change are searched for a size similar to the size of the object of interest in the object extraction image. In addition, "similar size" represents that each of the difference of the vertical size and the difference of the horizontal size has a predetermined value or less. However, the definition of "similar size" is not limited to a specific definition.

If the object determination unit 403 determines in step S602 that a size similar to the size of the object of interest in the object extraction image is registered in the size table (if the search succeeds), the process advances to step S603. On the other hand, if the object determination unit 403 determines that a size similar to the size of the object of interest in the object extraction image is not registered in the size table (if the search fails), the process advances to step S610.

In step S603, the object determination unit 403 searches a shape table created in advance and stored in the storage unit 126 for shape information representing a shape similar to the shape of the object of interest in the object extraction image. Shape information representing the shape of each object on an image is registered in the shape table for each object valid as a shooting target. Here, "similar shape" represents that the similarity between shapes has a predetermined value or more. However, the definition of "similar shape" is not limited to a specific definition.

In this search processing, the object of interest in the object extraction image is scaled (enlarged/reduced), and the shape table is searched for shape information representing a shape whose similarity to the shape of the object of interest after the scaling has the predetermined value or more. The shape table is constituted by at least one parameter. For example, when shooting a soccer game, shape information representing the shape of an object such as a person (a player, a coach, or a referee), a ball, or a goal on the field is registered. The shape information may include shape information representing shapes of an object viewed from a plurality of viewpoints.

If the object determination unit 403 determines in step S604 that shape information representing a shape similar to the shape of the object of interest in the object extraction image is registered in the shape table (if the search succeeds), the process advances to step S605. On the other hand, if the object determination unit 403 determines that shape information representing a shape similar to the shape of the object of interest in the object extraction image is not registered in the shape table (if the search fails), the process advances to step S610.

In step S605, the object determination unit 403 searches a hue table created in advance and stored in the storage unit 126 for hue information representing a hue similar to the hue of the object of interest in the object extraction image. Hue information representing the hue of each object is registered in the hue table for each object valid as a shooting target. Here, the hue of an object means the luminance distribution of each of the R, G, and B components extracted for the object by the histogram extraction unit 402. The hue table is constituted by at least one parameter. For example, in a case of shooting a soccer game, the hue table is the histogram of the hue of an object such as a person (a player, a coach, or a referee), a ball, or a goal on the field. The histogram of a hue is data obtained by extracting the luminance distribution of each of the R, G, and B components for each object before the game. In addition, "similar hue" represents that the similarity between hues has a predetermined value or more. However, the definition of "similar hue" is not limited to a specific definition.

If the object determination unit 403 determines in step S606 that hue information representing a hue similar to the hue of the object of interest in the object extraction image is registered in the hue table (if the search succeeds), the process advances to step S607. On the other hand, if the object determination unit 403 determines that hue information representing a hue similar to the hue of the object of interest in the object extraction image is not registered in the hue table (if the search fails), the process advances to step S610.

In step S607, the object determination unit 403 searches the positions of objects in the upstream object extraction image or predicted positions predicted from the positions for a position similar to the position of the object of interest in the object extraction image. In this search processing, for each object in the upstream object extraction image, a search region with respect to the position of the object or a predicted position predicted from the position as the center is set. The set regions are searched for a set region including the position of the object of interest in the object extraction image. If the set region including the position of the object of interest in the object extraction image can be found, it is determined that the object corresponding to the search region and the object of interest are similar concerning the position.

A predicted position predicted from the position of an object in the upstream object extraction image can be obtained by, for example, the following method. For example, the object determination unit 403 of the sensor system 110b obtains the correspondence relationship between a pixel position on an image captured by the camera 112a and a pixel position on an image captured by the camera 112b in accordance with the placement position and orientation of the camera 112b with respect to the placement position and orientation of the camera 112a. The correspondence relationship may be obtained in advance upon placing the camera. Using the correspondence relationship, the object determination unit 403 of the sensor system 110b obtains, as the predicted position of the object, a position on the object extraction image corresponding to the image captured by the camera 112b, which corresponds to the position of the object on the object extraction image corresponding to the image captured by the camera 112a. Note that the method of obtaining the predicted position is not limited to a specific obtaining method.

The upstream object extraction image is an object extraction image generated by the camera adapter 120 on the upstream side and received via the data receiving unit 122. The upstream object extraction image needs to be adapted to the object extraction image by performing projective transformation and alignment processing. Note that the processing of adapting the upstream object extraction image to the object extraction image is not limited to this, and another processing may be used.

If the object determination unit 403 determines in step S608 that a set region including the position of the object of interest in the object extraction image is found by the search processing in step S607, the process advances to step S609. On the other hand, if the object determination unit 403 determines that a set region including the position of the object of interest in the object extraction image is not found by the search processing in step S607, the process advances to step S610.

In step S609, the object determination unit 403 decides the object of interest as a valid object that is an object valid as a shooting target. On the other hand, in step S610, the object determination unit 403 decides the object of interest as an invalid object that is not an object valid as a shooting target (an object invalid as a shooting target).

In this embodiment, it is decided whether the object of interest is a valid object or an invalid object by performing processing according to the flowchart of FIG. 5 described above. However, the processing of deciding whether the object of interest is a valid object or an invalid object may be implemented not by the processing according to the flowchart of FIG. 5 but by another processing. For example, the conditions to decide whether the object of interest is a valid object/invalid object may be increased/decreased or changed as compared to the flowchart of FIG. 5. That is, the object determination unit 403 can determine whether the object of interest is a valid object or an invalid object based on the result of comparison between at least one of the size, shape, hue, and detection position of the object of interest and registration information registered in advance.

Figure 6:
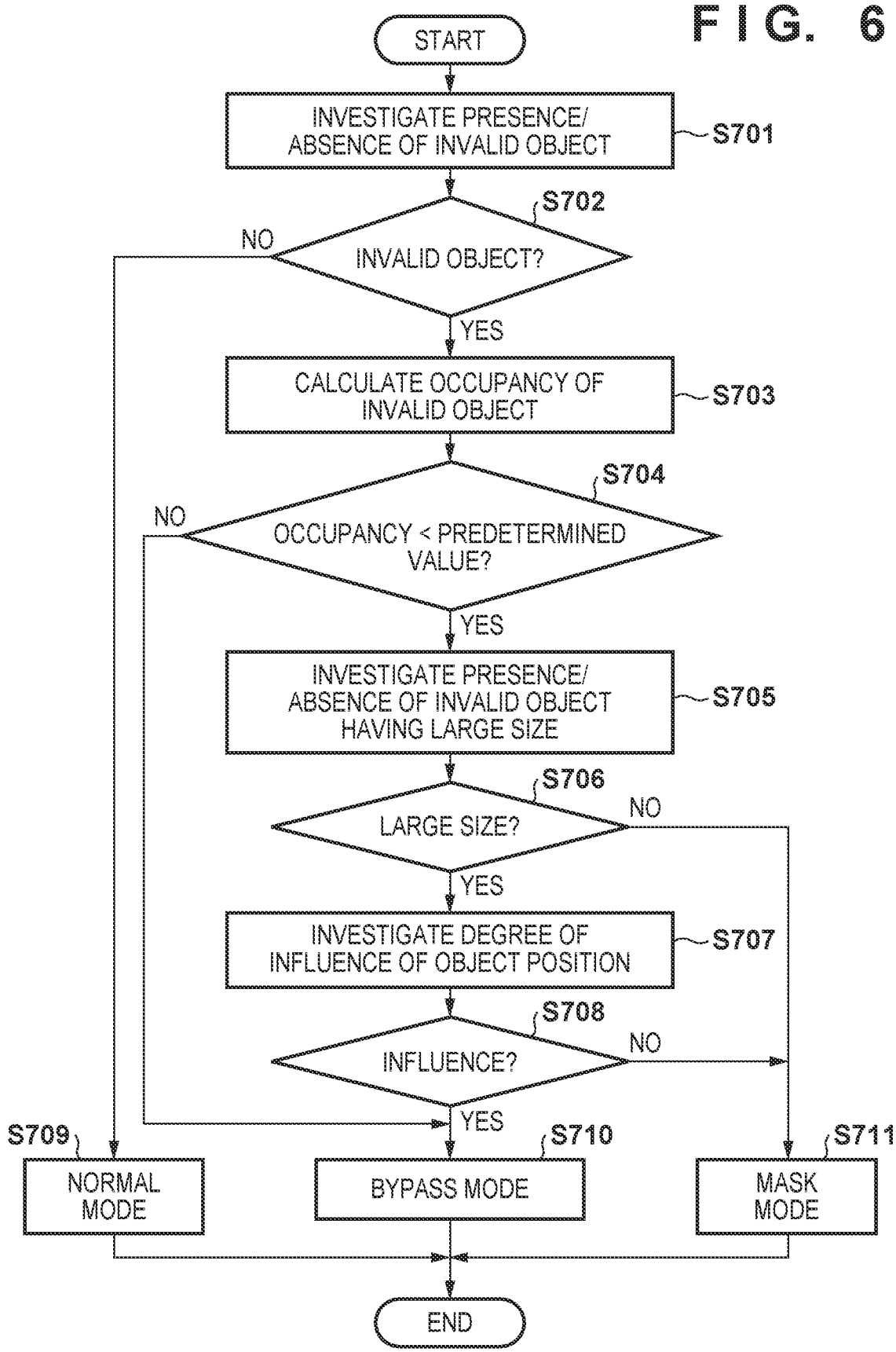
FIG. 6 is a flowchart of processing performed by a final determination unit 404.

Referring back to FIG. 3, a final determination unit 404 determines whether the local camera image is an image inappropriate for generation of a virtual viewpoint content, and in accordance with the result of the determination, switches an operation mode used by the camera adapter 120 to transmit data (transmission information) to the camera adapter 120 on the downstream side. The operation of the final determination unit 404 will be described with reference to the flowchart of FIG. 6.

In step S701, the final determination unit 404 determines whether at least one invalid object exists in the local camera image (object extraction image). If at least one invalid object exists in the local camera image (object extraction image) as the result of the determination, the process advances to step S703 via step S702. If no invalid object exists, the process advances to step S709 via step S702.

In step S703, the final determination unit 404 obtains the ratio (occupancy) of all invalid objects in the local camera image (object extraction image). That is, the final determination unit 404 calculates occupancy=(number of pixels constituting all invalid objects/number of pixels of local camera image (object extraction image)).

In step S704, the final determination unit 404 determines whether the occupancy obtained in step S703 is less than a predetermined value (less than a threshold). If the occupancy obtained in step S703 is less than the predetermined value as the result of the determination, the process advances to step S705. If the occupancy obtained in step S703 is equal to or more than the predetermined value, the process advances to step S710.

In step S705, the final determination unit 404 searches the invalid objects in the local camera image (object extraction image) for an invalid object having a size equal to or larger than a predetermined size. As the size of the invalid object, the size obtained for the invalid object in step S601 described above is used. As the predetermined size used in step S705, for example, when shooting a soccer game, the maximum size of a person such as a player, a coach, or a referee is set. In addition, the predetermined size may be varied dynamically based on the zoom ratio in the SDI ancillary data captured by the video input unit 121.

If at least one invalid object having a size equal to or larger than the predetermined size exists among the invalid objects in the local camera image (object extraction image) as the result of the search in step S705, the process advances to step S707 via step S706. On the other hand, if no invalid object having a size equal to or larger than the predetermined size exists at all among the invalid objects in the local camera image (object extraction image) as the result of the search in step S705, the process advances to step S711 via step S706.

In step S707, the final determination unit 404 determines whether at least one invalid object having a size equal to or larger than a predetermined size is located at the central region of the local camera image (object extraction image). The central region of the local camera image (object extraction image) is, for example, a region of the local camera image (object extraction image) except regions near the four corners.

An invalid object having a size equal to or larger than a predetermined size may have another object such as a person hidden behind the invalid object. For this reason, in step S707, the degree of influence to be given when generating a virtual viewpoint content is investigated using the position of the invalid object having a size equal to or larger than the predetermined size. The investigation method is not limited to this. The image may be compared with the foreground image of the immediately preceding frame to investigate whether another object is not hidden behind the invalid object having a size equal to or larger than the predetermined size.

If at least one invalid object having a size equal to or larger than the predetermined size is located at the central region of the local camera image (object extraction image) as the result of the determination (investigation) in step S707, the process advances to step S710 via step S708. On the other hand, if no invalid object having a size equal to or larger than the predetermined size is located at the central region of the local camera image (object extraction image) at all as the result of the determination (investigation) in step S707, the process advances to step S711 via step S708.

In step S709, the final determination unit 404 sets a normal mode as the operation mode (a transmission processing mode of information to the downstream side) of the camera adapter 120. In step S710, the final determination unit 404 sets a bypass mode as the operation mode of the camera adapter 120. In step S711, the final determination unit 404 sets a mask mode as the operation mode of the camera adapter 120.

Referring back to FIG. 3, a mask image generation unit 405 operates only when the operation mode set by the final determination unit 404 is the mask mode. The mask image generation unit 405 generates a mask image in which different pixel values are assigned to the region of an invalid object and the remaining region in the object extraction image. The mask image has the same resolution as the object extraction image (local camera image). If a pixel position (x, y) in the object extraction image is included in the region of the invalid object, the mask image generation unit 405 assigns a first value (for example, 1) as the pixel value at the pixel position (x, y) on the mask image. On the other hand, if the pixel position (x, y) in the object extraction image is included in the region other than the region of the invalid object, the mask image generation unit 405 assigns a second value (≠ first value, for example, 0) as the pixel value at the pixel position (x, y) on the mask image.

If the operation mode set by the final determination unit 404 is the mask mode, a mask processing unit 406 performs the following processing, thereby generating a mask-processed image and outputting it. That is, this is processing of generating a mask-processed image by replacing an image in a region on the local camera image corresponding to the region constituted by the pixels assigned the first value in the mask image with an image in a region corresponding to the region in the upstream background image and outputting the mask-processed image. Note that the background image used in this replacement is not limited to the upstream background image. If the operation mode set by the final determination unit 404 is a mode (normal mode or bypass mode) other than the mask mode, the mask processing unit 406 directly outputs the local camera image.

If the normal mode is set, the foreground/background separation unit 124 separates a local camera image into a foreground image and a background image. If the mask mode is set, the foreground/background separation unit 124 separates a mask-processed image generated by the mask processing unit 406 into a foreground image and a background image. If the bypass mode is set, the foreground/background separation unit 124 and the generation unit 125 do not operate.

If the normal mode is set as the operation mode of the camera adapter 120, the data transmitting unit 127 transmits data to be listed below to the camera adapter 120 on the downstream side.

Data (the upstream foreground image, the upstream background image, the upstream 3D model information, and the upstream object extraction image) that the data receiving unit 122 receives from the upstream side and stores in the storage unit 126

The foreground image and the background image separated from the local camera image by the foreground/background separation unit 124

The 3D model information generated by the generation unit 125

The object extraction image generated by the fault image determination unit 123 (object extraction unit 401)

If the bypass mode is set as the operation mode of the camera adapter 120, the data transmitting unit 127 transmits data to be listed below to the camera adapter 120 on the downstream side.

Data (the upstream foreground image, the upstream background image, the upstream 3D model information, and the upstream object extraction image) that the data receiving unit 122 receives from the upstream side and stores in the storage unit 126

The object extraction image generated by the fault image determination unit 123 (object extraction unit 401)

If the mask mode is set as the operation mode of the camera adapter 120, the data transmitting unit 127 transmits data to be listed below to the camera adapter 120 on the downstream side.

Data (the upstream foreground image, the upstream background image, the upstream 3D model information, and the upstream object extraction image) that the data receiving unit 122 receives from the upstream side and stores in the storage unit 126

The foreground image and the background image separated from the mask-processed image by the foreground/background separation unit 124

The 3D model information generated by the generation unit 125

The object extraction image generated by the fault image determination unit 123 (object extraction unit 401)

Figure 7A:
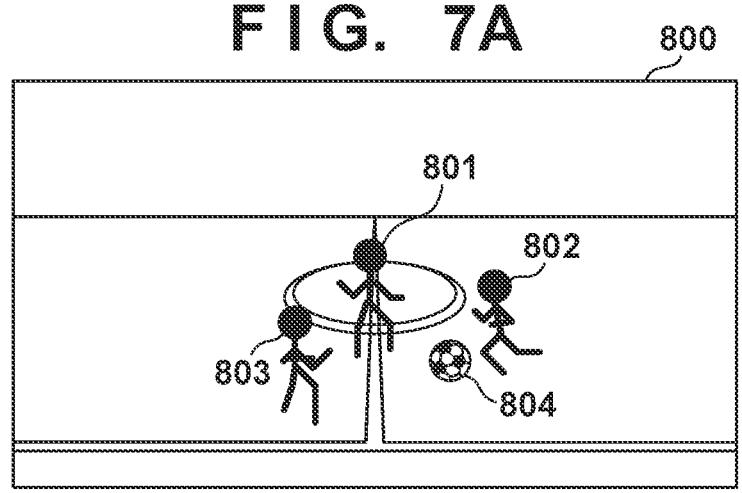
FIG. 7A is a view for explaining the operation of the camera adapter 120 according to a local camera image.
Figure 7B:
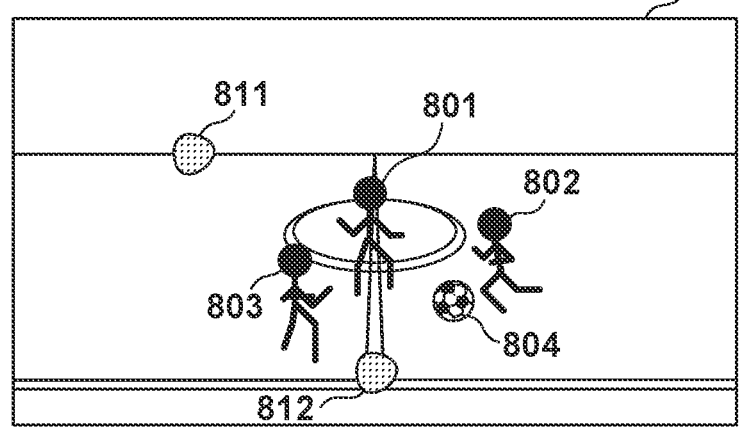
FIG. 7B is a view for explaining the operation of the camera adapter 120 according to the local camera image.
Figure 7C:
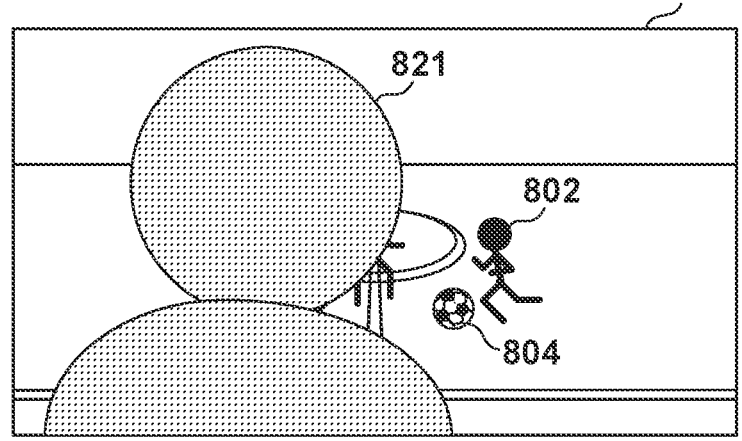
FIG. 7C is a view for explaining the operation of the camera adapter 120 according to the local camera image.

The operation of the camera adapter 120 according to the local camera image will be described with reference to FIGS. 7A to 7C. FIGS. 7A, 7B, and 7C each show a local camera image received by the camera adapter 120 during shooting of a soccer game. Each local camera image is received at an arbitrary time.

A local camera image 800 shown in FIG. 7A is a local camera image obtained by shooting a player 801, a player 802, and a player 803, who are playing on the field, and a ball 804. The fault image determination unit 123 performs the above-described processing for the local camera image 800, thereby setting the normal mode as the operation mode of the camera adapter 120. In the camera adapter 120 set in the normal mode, the foreground/background separation unit 124 separates the local camera image 800 to which mask processing by the mask processing unit 406 is not applied into a foreground image and a background image. The generation unit 125 generates 3D model information using the foreground image separated by the foreground/background separation unit 124 and an upstream foreground image received by the data receiving unit 122. The fault image determination unit 123 generates an object extraction image from the local camera image 800. The data transmitting unit 127 transmits the foreground image, the background image, the 3D model information, the object extraction image, the upstream foreground image, an upstream background image, upstream 3D model information, and an upstream object extraction image to the adjacent camera adapter 120 on the downstream side.

A local camera image 810 shown in FIG. 7B is a local camera image including a dust particle 811 and a dust particle 812 sticking to the camera lens. The fault image determination unit 123 performs the above-described processing for the local camera image 810, thereby setting the mask mode as the operation mode of the camera adapter 120. In the camera adapter 120 set in the mask mode, an object extraction image and a mask-processed image are generated by the fault image determination unit 123. The mask-processed image is an image obtained by replacing images in the regions of the dust particles 811 and 812 in the local camera image 810 with images in corresponding regions in the background image. The foreground/background separation unit 124 separates the mask-processed image to which mask processing by the mask processing unit 406 is applied into a foreground image and a background image. The generation unit 125 generates 3D model information using the foreground image separated by the foreground/background separation unit 124 and the upstream foreground image received by the data receiving unit 122. The data transmitting unit 127 transmits the foreground image, the background image, the 3D model information, the object extraction image, the upstream foreground image, an upstream background image, upstream 3D model information, and an upstream object extraction image to the adjacent camera adapter 120 on the downstream side.

The difference between the normal mode and the mask mode is whether to apply mask processing to the local camera image. Even in the mask mode (even if the mask processing is applied), processing equivalent to that in the normal mode can be performed.

A local camera image 820 shown in FIG. 7C is a local camera image including a spectator 821 suddenly standing up in front of the camera. The fault image determination unit 123 performs the above-described processing for the local camera image 820, thereby setting the bypass mode as the operation mode of the camera adapter 120. In the camera adapter 120 set in the bypass mode, an object extraction image is generated by the fault image determination unit 123. When the bypass mode is set, the foreground/background separation unit 124 and the generation unit 125 do not operate. The data transmitting unit 127 transmits the object extraction image, an upstream foreground image, an upstream background image, upstream 3D model information, and an upstream object extraction image to the adjacent camera adapter 120 on the downstream side.

The data transmitting unit 127 also transmits error information representing that an image (local camera image 820) inappropriate for generation of a virtual viewpoint content is detected to the adjacent camera adapter 120 on the downstream side.

In the bypass mode, the camera adapter 120 not only transfers the information group received from the camera adapter 120 on the upstream side directly to the camera adapter on the downstream side but may also transmit error information. In this case, the camera adapter on the downstream side which has received the error information executes, for example, alternative processing of the camera adapter 120 within a possible range. For example, assume that error information is output from the camera adapter 120b to the camera adapter 120c. In this case, the camera adapter 120c generates a foreground image, a background image, 3D model information, and an object extraction image using a foreground image obtained by the camera adapter 120a and a foreground image obtained by the camera adapter 120c.

As described above, according to this embodiment, it is possible to determine whether an image shot by a camera is an image inappropriate for generation of a virtual viewpoint content and control a camera adapter based on the determination result.

Second Embodiment

Figure 2:
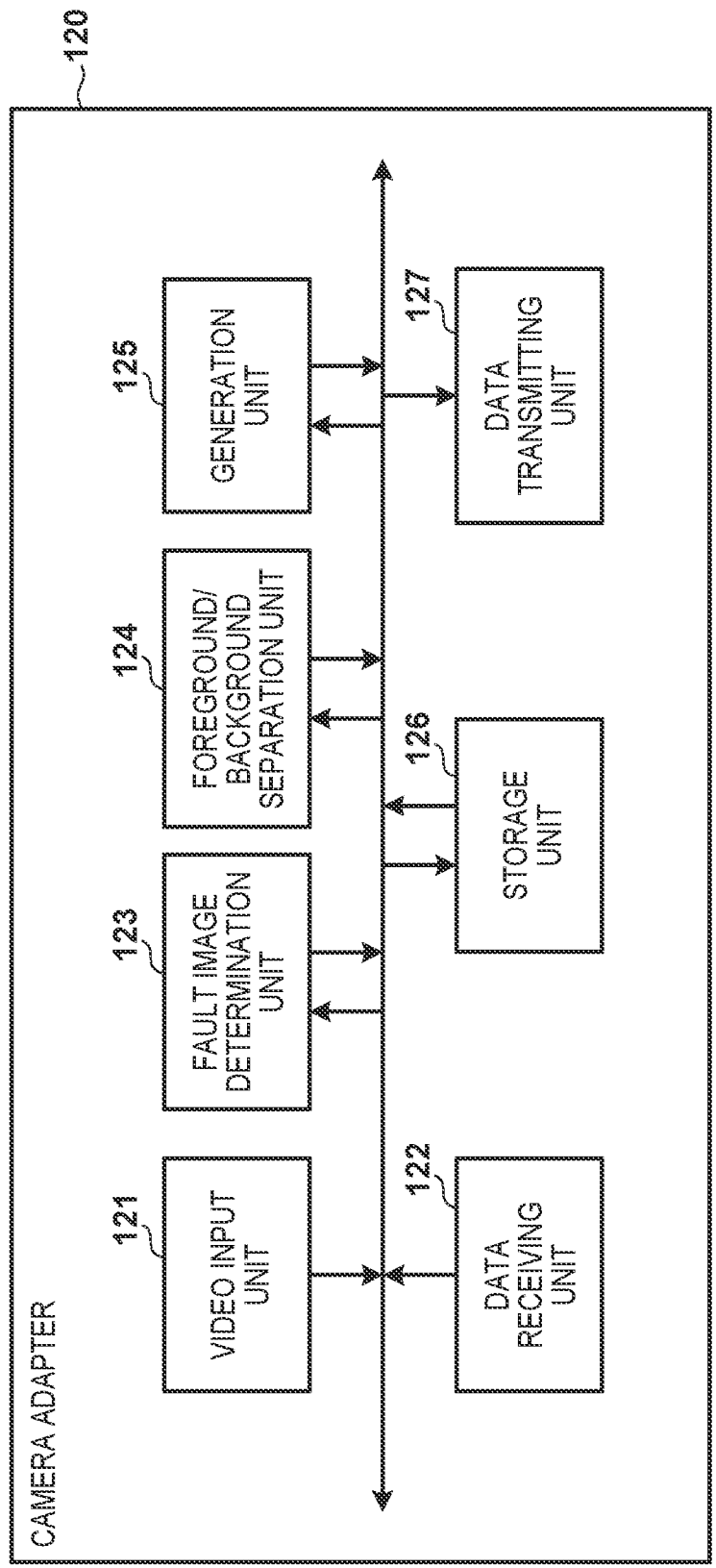
FIG. 2 is a block diagram showing an example of the functional arrangement of a camera adapter 120.
Figure 3:
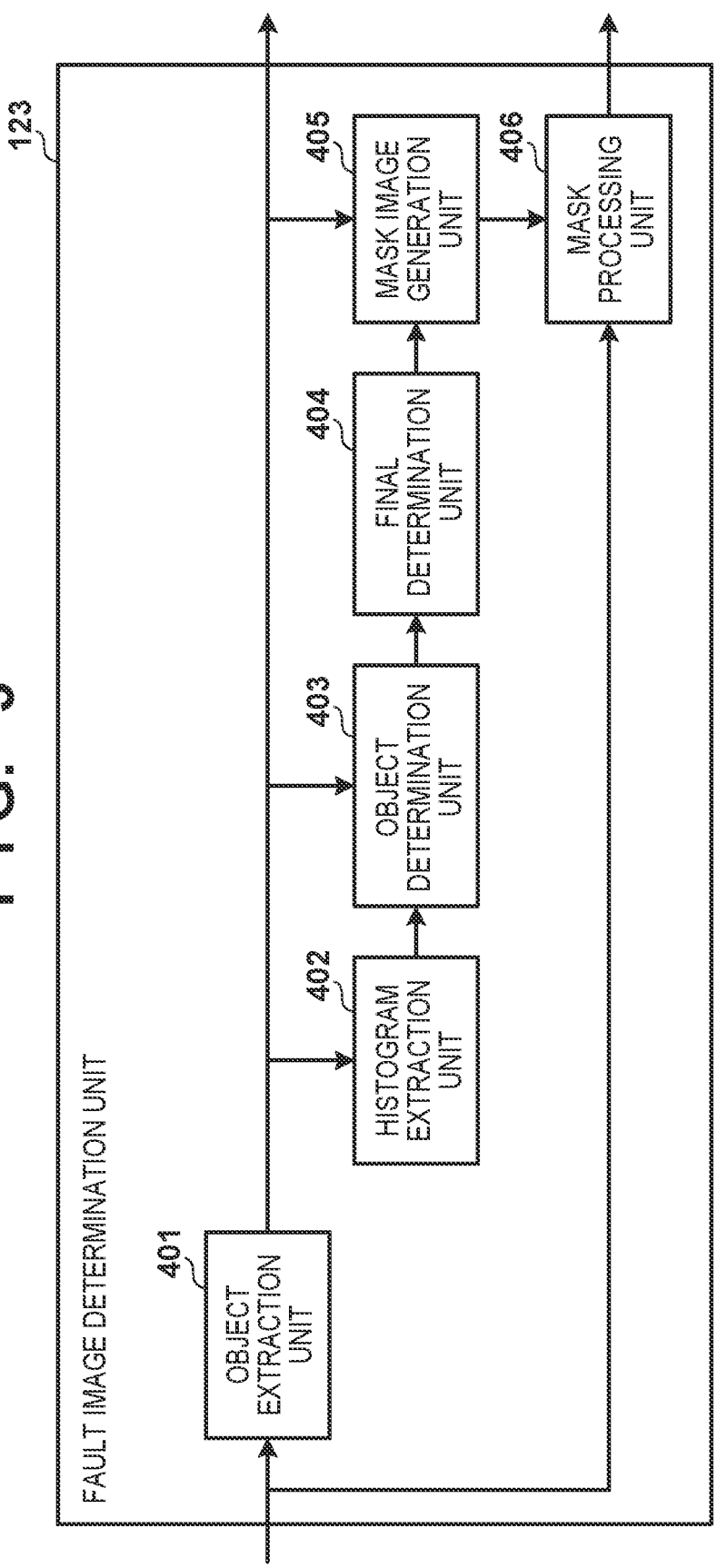
FIG. 3 is a block diagram showing an example of the functional arrangement of a fault image determination unit 123.

All the functional units shown in FIGS. 2 and 3 may be implemented by hardware. Alternatively, some or all of them may be implemented by software (computer program). In the latter case, for example, a storage unit 126 may be implemented by a memory, and the remaining functional units may be implemented by a computer program. In this case, the computer program is executed by, for example, a processor in a camera adapter 120.

Note that in the above-described embodiments, an example in which the plurality of camera adapters 120 are connected by a daisy chain has mainly been described. However, the present invention is not limited to this example. For example, the plurality of camera adapters 120 may be connected to the server 200 by a star topology. An example of processing executed when the star topology is employed will be described below. That is, upon determining that an invalid object exists in the processing shown in FIG. 5, the camera adapter 120 outputs a mask-processed image obtained by masking the region of the invalid object to the server 200. On the other hand, upon determining that no invalid object exists in the captured image, the camera adapter 120 outputs the captured image to the server 200. The server 200 generates a virtual viewpoint content based on the mask-processed image or captured image received from each camera adapter 120. According to this embodiment as well, a cause of an adverse effect on generation of a virtual viewpoint content can be suppressed or eliminated.

In the above-described embodiments, an example in which the camera 112 and the camera adapter 120 are separate devices has mainly been described. However, the present invention is not limited to this example. That is, the functions of the camera adapter 120 may be implemented by the camera 112.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-000709, filed Jan. 5, 2017, which is hereby incorporated by reference herein in its entirety.

What is claimed is:

1. An apparatus comprising:
one or more memories storing instructions; and
one or more processors executing the instructions to:
(1) obtain an image based on capturing by an image capturing device,
(2) perform specific processing on the obtained image based on an object which is included in the obtained image and is captured by the image capturing device being inappropriate for generation of three-dimensional model information, and
(3) generate the three-dimensional model information based on the obtained image on which the specific processing is performed,
wherein, in a case where the object which is included in the obtained image and is captured by the image capturing device is appropriate for generation of the three-dimensional model information, the three-dimensional model information is generated using the obtained image on which the specific processing is not performed.

2. The apparatus according to claim 1, wherein the specific processing comprises mask processing to be performed on the obtained image.

3. The apparatus according to claim 2, wherein the mask processing is performed to the object which is included in the obtained image and is inappropriate for generation of the three-dimensional model information.

4. The apparatus according to claim 1, wherein the three-dimensional model information is generated based on the obtained image on which the specific processing is performed and another image based on capturing by another image capturing device.

5. The apparatus according to claim 1, wherein the object which is inappropriate for generation of the three-dimensional model information is an object that is not an object corresponding to information registered in advance.

6. The apparatus according to claim 1, wherein the one or more processors further execute the instructions to generate a virtual viewpoint content based on the obtained image on which the specific processing is performed.

7. The apparatus according to claim 1, wherein the three-dimensional model information comprises image information concerning a three-dimensional model.

8. An apparatus comprising:
one or more memories storing instructions; and
one or more processors executing the instructions to:
(1) obtain an image based on capturing by an image capturing device, (2) determine whether an object which is included in the obtained image and is captured by the image capturing device is inappropriate for generation of three-dimensional model information,
(3) perform specific processing on the obtained image based on determining that the object which is included in the obtained image and is captured by the image capturing device is inappropriate for generation of three-dimensional model information, and
(4) generate the three-dimensional model information based on the obtained image on which the specific processing is performed.

9. A method comprising:
obtaining an image based on capturing by an image capturing device;
performing specific processing on the obtained image based on an object which is included in the obtained image and is captured by the image capturing device being inappropriate for generation of three-dimensional model information; and
generating the three-dimensional model information based on the obtained image on which the specific processing is performed,
wherein, in a case where the object which is included in the obtained image and is captured by the image capturing device is appropriate for generation of the three-dimensional model information, the three-dimensional model information is generated using the obtained image on which the specific processing is not performed.

10. A non-transitory computer-readable storage medium storing a computer program configured to cause a computer to execute a method, the method comprising:
obtaining an image based on capturing by an image capturing device;
performing specific processing on the obtained image based on an object which is included in the obtained image and is captured by the image capturing device being inappropriate for generation of three-dimensional model information; and
generating the three-dimensional model information based on the obtained image on which the specific processing is performed,
wherein, in a case where the object which is included in the obtained image and is captured by the image capturing device is appropriate for generation of the three-dimensional model information, the three-dimensional model information is generated using the obtained image on which the specific processing is not performed.

* * * * *